United States Patent [19]

Ise et al.

[11] Patent Number: 4,517,548
[45] Date of Patent: May 14, 1985

[54] TRANSMITTER/RECEIVER CIRCUIT FOR SIGNAL TRANSMISSION OVER POWER WIRING

[75] Inventors: Masahiro Ise, Kashihara; Katsuyuki Machino, Nara; Hidehiko Tanaka; Toshiyuki Matsubara, both of Tenri, all of Japan

[73] Assignee: Sharp Kabushiki Kaisha, Osaka, Japan

[21] Appl. No.: 451,019

[22] Filed: Dec. 20, 1982

[51] Int. Cl.³ .............................................. H04B 3/54
[52] U.S. Cl. .................................... 340/310 R; 307/3
[58] Field of Search .......... 340/310 R, 310 A, 870.29, 340/310 CP; 307/3, 140

[56] References Cited

U.S. PATENT DOCUMENTS

| | | | |
|---|---|---|---|
| 3,229,184 | 1/1966 | Churchill | 307/3 |
| 3,878,322 | 4/1975 | Sullivan | 340/310 R |
| 4,180,804 | 12/1979 | Watanabe | 340/310 R |
| 4,408,185 | 10/1983 | Rasmussen | 340/310 R |

Primary Examiner—James J. Groody
Attorney, Agent, or Firm—Birch, Stewart, Kolasch & Birch

[57] ABSTRACT

A system transmits and receives control signals for various types of indoor devices using the existing power wiring in houses and buildings. The transmitter section of the power wiring transmission system is provided with a circuit in which the output of a sine wave oscillator is fed to an emitter-follower through a photocoupler and this output is then fed to the indoor power distribution line through a series resonance circuit after stepping down with a transformer; and the receiving section is provided with a circuit in which the signal from the distribution line is fed to a parallel resonance circuit after passing through a series resonance circuit. Moreover, the input and output sections are resistor terminated.

1 Claim, 7 Drawing Figures

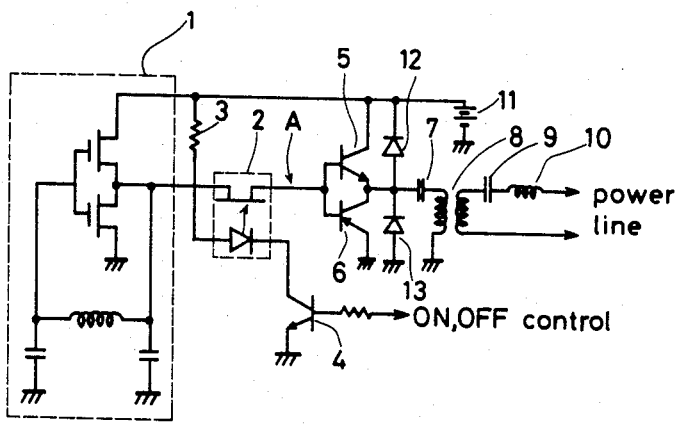
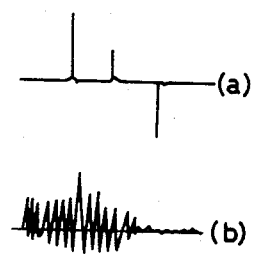
FIG. 1       FIG. 2
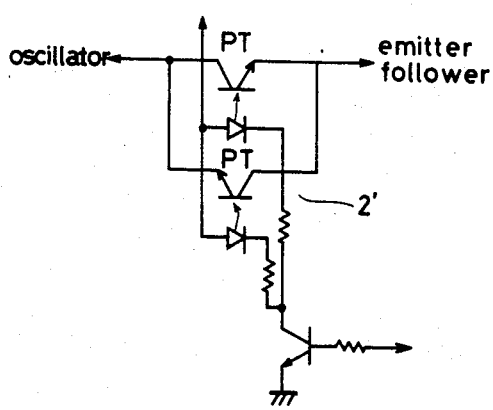
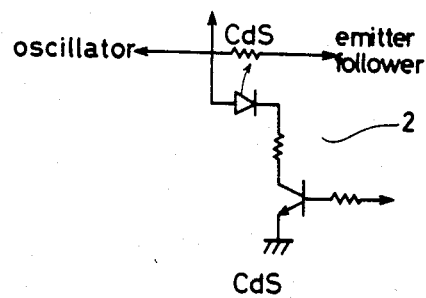
FIG. 3 (a)       FIG. 3 (b)

TRANSMITTER/RECEIVER CIRCUIT FOR SIGNAL TRANSMISSION OVER POWER WIRING

BACKGROUND OF THE INVENTION

This invention is in relation to a transmitter/receiver circuit for signal transmission over power wiring.

In the transmitting section of such a power wiring transmission system, the lower the output impedance, the better, for effective superimposing of signals on the distribution line. However, attachment of low impedance loads to the distribution line should be prevented and carrier leakages due to the effffects of high level noise (thyristor noise etc.) on the input side must also be prevented during transmission breaks. On the one hand, higher input impedance is better, from the standpoint of the receiving section, to prevent drops in signal level at the receiving point and also to prevent loading when a number of receiving units are connected.

SUMMARY OF THE INVENTION

The present invention has taken the above mentioned points into consideration and is a system in which the problems in previous equipment have been resolved.

To attain the above objectives, the present invention offers a transmitter/receiver circuit for power wiring which consists of a power wiring transmitter section in which the output from a sine wave oscillator is fed to an emitter-follower through a photocoupler and, after passing this output through a step-down transformer, is connected to the indoor distribution lines through a series resonance circuit; and a receiving section in which the signals are fed to a parallel resonance circuit from the indoor distribution line through a series resonance circuit. Moreover, the input and output sections are resistance terminated.

BRIEF DESCRIPTION OF THE DRAWINGS

FIG. 1 is a diagram of the electrical circuit of the transmitter circuit in an example of the present invention in operation;

FIGS. 2(a) and (b) are time charts showing examples of various types of noise,

FIGS. 3(a) and (b) are diagrams showing alternatives to photocoupler 2 in FIG. 1.

DETAILED DESCRIPTION OF THE INVENTION

Figure 4:
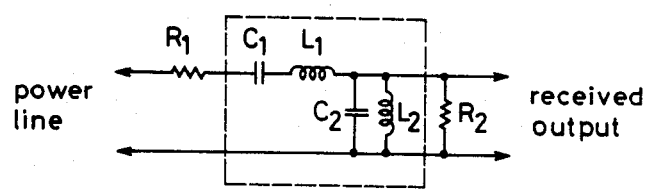
FIG. 4 is a diagram showing an example of the filter circuit in the receiver unit.

We shall first start by describing the transmitter. FIG. 1 is the electrical circuit of the transmitter. This circuit includes sine wave oscillator circuit 1, photocoupler (2-directional FET type) 2, current limiting resistor 3 for the photocoupler LED, transistor 4 that controls the LED by an ON-OFF signal from the control section (microcomputer etc.), emitter-follower transistors 5 and 6 for lowering the impedance, decoupling capacitor 7, step-down transformer 8 (n:1) to further lower impedance, series resonance circuits 9 and 10 to isolate the distribution line voltage and feed the carrier to the distribution line at a low impedance, power supply 11, and high level distribution line noise suppression diodes 12 and 13.

Although the output impedance of normal transistor emitter-followers (5 and 6 in the diagram) is about 15 ohm, this is not satisfactory, as the distribution line impedance is only about 2 to 5 ohm. Step-down transformer 8 is therefore inserted between the emitter-follower and the distribution line and the desired impedance obtained by setting the output impedance to $1/n^2$ (n is the turns ratio). It will be necessary to generate a signal of n times the final level with the sine wave oscillator circuit for the output voltage to also be 1/n. However, it will serve no purpose even if the impedance applied to stepdown transformer 8 is lowered if the impedance at the connection to the distribution line remains high. For this reason capacitor 9 and coil 10 are inserted in the form of a series resonance circuit at the connection where only a capacitor is used normally. Although operation during transmission is as explained above, consideration of the circuit operation during transmission breaks is also necessary. As various devices are generally connected to the distribution line, various types of noise will be mixed on the line. The principal types will be thyristor noise (FIG. 2(a)) and motor brush noise (vacuum cleaners etc., FIG. 2(b)). These noise levels reach a maximum of 30 $V_{pp}$ for thyristor and 2 $V_{pp}$ for vacuum cleaners. These noise frequencies pass through the series resonance circuit 9, 10 and are added to the base of emitter-follower 5, 6 after being stepped up through transformer 8.

However, as photocoupler 2 acts as an isolating analog switch, the emitter-follower will be in a completely isolated OFF state and will therefore not load the distribution line as its output impedance is high. Although the secondary impedance of step-down transformer 8 will be the direct load during the OFF state, there will therefore be no significant problem if a sufficiently high impedance (over 1 mH) is selected. Also, as the control of the analog switch is completely isolated from the switch, there will be no adverse effects even if there is line noise present on the base.

As the switch and control parts are not completely isolated in normal analog switches (transistors, FET's, CMOS's etc.), in essence, carrier leakage to the distribution line will occur for ON commands issued by the control section when the level at point A (base of emitter-follower 5, 6) becomes momentarily high or low. If point A is grounded through a resistor or capacitor in an attempt to prevent this, a low impedance load will be presented to the distribution line as emitter-follower 5, 6 will not be completely isolated. As each power wiring transmission section is normally made up of a transmitter/receiver pair, the load during OFF periods of the transmitter is undesirable when a large number of units are connected for answer back service on the assumption of improved reliability. This invention completely resolves the abovementioned problems.

Instead of the 2-way FET shown in FIG. 1, photo transistors (2 sets used to obtain 2-way characteristics) connected as shown in FIG. 3(a) and (b) and CDS can also be used for photocoupler 2. Photothyristors are not suitable as they are turned ON easily but require additional circuitry to turn OFF and as their switching speed is slow.

We shall now explain the receiving section. In power wiring transmission using an AM system, data transmission is carried out by turning a special carrier frequency ON and OFF. To block the distribution line voltage and effectively remove the noise elements, the narrower the band width of the filter used, the better the results. Better results are also obtained with higher input impedance at the receiving point to prevent attenuation of the signal and to prevent loading when a number of receiving circuits are connected. Although a signal tuning circuit is normally used in this section, this will not be suitable here considering the foregoing problems. As shown in FIG. 4, this example uses a series resonance circuit composed of capacitor C1 and coil L1 as a filter at the connection to the distribution line and a parallel resonance circuit composed of capacitor C2 and coil L2 on the load side. If the circuit within the dotted lines in FIG. 4 satisfies the following condition, it can be treated a a constant-K filter and this simplifies design.

$$C_1 L_1 = C_2 L_2 \qquad (1)$$

The various parameters of the filter may be obtained as follows.

$$\text{Characteristic impedance: } Z_0 = \sqrt{\frac{C_1}{C_2}} \left( = \sqrt{\frac{L_2}{C_1}} \right) \qquad (2)$$

$$\text{Center frequency: } f_0 = \frac{1}{2\pi \sqrt{L_1 C_1}} \left( = \frac{1}{2\pi \sqrt{L_2 C_2}} \right) \qquad (3)$$

$$\text{Bandwidth: } \Delta = \frac{Z_0}{L_1} \left( = \frac{1}{C_2 Z_0} \right) \qquad (4)$$

The characteristic impedance determines the impedance at the input and output sections of the filter and can be arbitrarily selected by means of $C_1$, $C_2$, $L_1$ and $L_2$. However, if we select 1k ohm for example to disregard the load effect, the anticipated filter characteristics will not be obtained as it will be extremely mismatched with a line impedance of only about 2 to 5 ohm. In this invention, resistors $R_1$ and $R_2$ have been inserted to match the input/output sections with the characteristic impedance. When $Z_0$ . . distribution line impedance and also $Z_0$ , , input impedance of the next stage (inputs to emitter-follower, MOS etc.), the following can be selected.

$$R_1 = R_2 = Z_0 \qquad (5)$$

The receiving level in this condition will be ½ the level on the distribution line.

Figure 5:
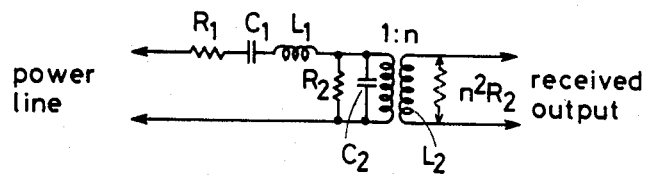
FIG. 5 is a diagram showing an example of the filter of FIG. 4, inductance-coupled to increase the level.
Figure 6:
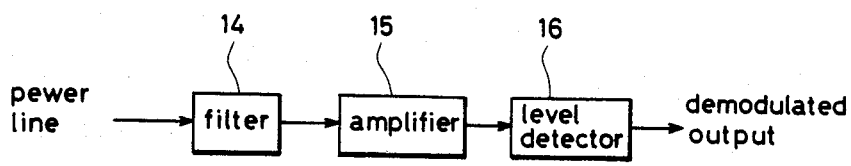
FIG. 6 is a block diagram showing the outline of the receiving system.

If a coil with ratio 1:n is added as shown in FIG. 5 to isolate the portion following the output of the filter from the distribution line and also to give additional voltage gain, a receiving level of n/2 will be realized. Although $R_2$ may be repositioned in the secondary at this time, its equivalent value must be $n^2 R_2$. Demodulation is carried out by means of an amplifier and level detector connected after the filter. In FIG. 6, 14 is the filter, 15 the amplifier and 16 the level detector.

What is claimed is:

1. A transmitter/receiver circuit for power wiring transmission system comprising a transmitting circuit in which the output of a sine wave oscillator is fed to an emitter-follower through a photocoupler and this output is then fed to the indoor distribution line through a series resonance circuit after passing through a step-down transformer; and a receiving circuit in which the signal from the distribution line is fed to a parallel resonance circuit after passing through a series resonance circuit and that the input and output sections are resistor terminated.

* * * * *